(12) United States Patent
Husmann

(10) Patent No.: US 9,850,094 B2
(45) Date of Patent: Dec. 26, 2017

(54) ACTUATOR FOR AN ELEVATOR BRAKE

(71) Applicant: Inventio AG, Hergiswil (CH)

(72) Inventor: Josef Husmann, Luzern (CH)

(73) Assignee: INVENTIO AG, Hergiswil (CH)

( * ) Notice: Subject to any disclaimer, the term of this patent is extended or adjusted under 35 U.S.C. 154(b) by 667 days.

(21) Appl. No.: 14/358,264

(22) PCT Filed: Dec. 6, 2012

(86) PCT No.: PCT/EP2012/074702
§ 371 (c)(1),
(2) Date: May 15, 2014

(87) PCT Pub. No.: WO2013/092239
PCT Pub. Date: Jun. 27, 2013

(65) Prior Publication Data
US 2014/0326544 A1 Nov. 6, 2014

(30) Foreign Application Priority Data
Dec. 21, 2011 (EP) ..................................... 11194963

(51) Int. Cl.
*B66B 5/22* (2006.01)
*B66B 5/18* (2006.01)
*F16D 65/28* (2006.01)
*B66B 5/16* (2006.01)
*F16D 121/26* (2012.01)
*F16D 131/00* (2012.01)

(52) U.S. Cl.
CPC .................. *B66B 5/16* (2013.01); *B66B 5/18* (2013.01); *F16D 65/28* (2013.01); *F16D 2121/26* (2013.01); *F16D 2131/00* (2013.01)

(58) Field of Classification Search
CPC .... B66B 5/16; B66B 5/22; B66B 5/18; F16D 65/28
See application file for complete search history.

(56) References Cited

FOREIGN PATENT DOCUMENTS

| DE | 102005045114 A1 | 4/2007 |
| DE | 102010023701 A1 | 12/2011 |
| EP | 1749785 A1 | 2/2007 |
| EP | 2058262 A1 | 5/2009 |
| JP | WO 2008149413 A1 * | 12/2008 ............... B66B 5/20 |

(Continued)

*Primary Examiner* — William A Rivera
*Assistant Examiner* — Stefan Kruer
(74) *Attorney, Agent, or Firm* — William J. Clemens; Shumaker, Loop & Kendrick, LLP

(57) ABSTRACT

An elevator installation braking device is actuated and reset by an electromechanical actuator including an energy store, a retaining device, a resetting device and at least one connecting element for connecting the actuator to the elevator brake. The resetting device retains the connecting element, via the retaining device and counter to the action of the energy store, in a first operating position, corresponding to a standby position of the brake, or guides the actuator back into this position. The energy store acts as required, upon release of the retaining device, on the connecting element to actuate the brake and to bring it into a corresponding engagement position. The resetting device has a recoil-prevention device to relieve recoil forces. The energy store can have a stop buffer to reduce the force impact when the energy store strikes an end position.

7 Claims, 9 Drawing Sheets

(56) References Cited

FOREIGN PATENT DOCUMENTS

| | | | |
|---|---|---|---|
| JP | 2009227353 | A | 10/2009 |
| WO | 2010107409 | A1 | 9/2010 |
| WO | 2011113753 | A2 | 9/2011 |
| WO | 2011113754 | A1 | 9/2011 |
| WO | 2012080102 | A1 | 6/2012 |

* cited by examiner 2 elevator car
3 counterweight
5 drive
8 guide shoe
10 elevator control
11 brake control
12 shaft door
13, 13' safety brake or elevator braking device
20 actuator

ACTUATOR FOR AN ELEVATOR BRAKE

FIELD

The invention relates to an actuator for actuating an elevator brake.

BACKGROUND

The elevator installation is installed in a building. It essentially consists of a car which is connected by way of support means with a counterweight or with a second car. The car is moved along substantially vertical guide rails by means of a drive which selectably acts on the support means or directly on the car or the counterweight. The elevator installation is used to convey persons and goods within the building over individual or several floors.

The elevator installation includes devices in order to safeguard the elevator car or also a counterweight in the case of failure of the drive or support means or in the case of other faulty behavior. For that purpose, use is usually made of elevator brakes which when required can brake the elevator car or the counterweight on the guide rails. These elevator brakes are increasingly actuated by electromechanical actuators.

An actuator of that kind is known from International Application WO2011/113754, which can actuate a pair of elevator brakes synchronously. This actuator counteracts possibly arising impact and shock loads by use of damping devices such as hydraulic, pneumatic or magnetic damping devices. Impact noise and material loads are thus reduced. It is unsatisfactory in that regard that actuation speed is slowed down by the use of damping devices of that kind.

SUMMARY

The invention has the object of providing an actuator which can accept impact and shock loads without negative influence on actuation speed.

In one embodiment an electromagnetic actuator for attachment to an elevator car of an elevator installation is provided. The electromechanical actuator is provided for actuation of a brake. For that purpose it includes an energy store, a retaining device, a resetting device and at least one connecting device for connecting the actuator with the brake or the brake equipment. The resetting device serves for resetting the electromechanical actuator into a first operating position corresponding with a readiness setting of the brake. It is also intended to transmit a retaining force for retaining the brake in the first operating position corresponding with the readiness setting. The resetting device in that case preferably acts, for retaining as well as resetting, on the energy store and the connecting element by way of the retaining device. The energy store for its part is so arranged that when required and when the retaining device is released it can act on the connecting element in order to actuate the brake and bring it into a corresponding applied setting.

Advantageously, the energy store acts on the connecting element by way of a trigger lever. This trigger lever is held in the readiness setting at a connecting point of a retaining electromagnet arranged at the retaining device. The retaining device is preferably arranged on a return lever, and a fulcrum of the return lever and a fulcrum of the trigger lever are arranged on a common axis. It is thus ensured that a pivot radius of the connecting point of the retaining device and of the trigger lever are the same. The connecting points can thus be moved synchronously with respect to one another in simple manner.

Advantageously, the connecting element for connecting the actuator with the brake is guided by way of the fulcrum of the trigger lever. The connecting element for that purpose includes a connecting strap which is connected on the one hand with the fulcrum of the trigger lever and on the other hand with the brake or brakes.

The resetting device of the electromechanical actuator advantageously includes recoil prevention means, preferably spring-loaded recoil prevention means, which relieves the resetting device of recoil forces. This is advantageous and useful, since the brakes can on occasion press back the connecting element of the electromechanical actuator. This can happen during a resetting process or it can also be the case that the connecting element is positioned in an intermediate position if, for example, a brake is not completely applied, since the elevator car has already come to a stop beforehand. In such cases the recoil prevention means prevents overloading or even damage of the resetting device and the entire actuator.

Advantageously, the energy store includes an impact buffer which reduces force shock when the energy store impinges in an end position. This is advantageous, since the energy store has stored a large amount of energy. In the usual case this energy is transmitted to the brake by way of appropriate connecting rods for actuation of the brake. In special cases, if, for example, a brake is not yet installed or when operations are carried out at the time of placing into service, this energy cannot be transmitted. The impact buffer in cases of that kind prevents overloading of material.

Advantageously, the resetting device, for the purpose of resetting the actuator into and retaining it in the first operating position corresponding with the readiness setting of the brake, acts on the retaining device by way of the recoil prevention means. The recoil prevention means is constructed for transmitting force in merely one direction. The recoil prevention means of the resetting device thus ensures that the resetting device is not subjected to uncontrolled loading. Insofar as, as previously stated, the connecting element is in an intermediate position it is thus ensured that the resetting device can operate and transmit force only in one line of action of force. Depending on the form of construction of the actuator and the resetting device this direction can be pulling or pushing. The resetting device is preferably designed for transmitting a tension force.

Advantageously, the resetting device is connected with the retaining device by way of a return carriage and this return carriage includes the recoil prevention means. For that purpose, the recoil prevention means includes, for example, a slot which co-operates with a guide pin integrated in the retaining device. An embodiment of that kind is advantageous with respect to production. In addition, the resetting device advantageously includes a spindle drive with a spindle nut. The spindle nut is arranged in the return carriage. A geared motor drives a return spindle co-operating with the spindle nut. The return carriage can thus be moved back and forth.

Advantageously, the retaining device is connected with a counterspring, which urges the retaining device together with the guide pin into the position corresponding with the first direction of the recoil prevention means. The recoil prevention means is thus a spring-loaded recoil prevention means. The force effect of the counterspring is in that case small by comparison with the force effect of the energy store.

The energy store of the electromechanical actuator is advantageously connected with the connecting element by way of a trigger lever. The energy store accordingly acts on this connecting element by way of the trigger lever. This trigger lever includes a connecting point. The trigger lever is held in the readiness setting at this connecting point by a retaining electromagnet arranged at the retaining device. The retaining device is in turn arranged on a return lever. A fulcrum of the return lever and a fulcrum of the trigger lever are arranged on a common axis or shaft so that a pivot radius of the connecting point of the retaining device and that of the trigger lever are the same. This is advantageous, since it is ensured by this arrangement that in the case of return or resetting of the trigger lever into the readiness setting the retaining device transits a path identical to the connecting point of the trigger lever.

The connecting element is advantageously guided by way of the fulcrum of the trigger lever and the connecting element further includes a connecting strap which is connected with the fulcrum of the trigger lever. The connecting element is preferably a shaft, which, for example, is rotatably or pivotably mounted in a housing of the actuator and to which the trigger lever and the connecting strap are secured. This shaft forms the fulcrum of the trigger lever. Use of a connecting strap of that kind is advantageous, since adaptation to required actuation paths can be carried out by the geometric form of this strap. The actuator itself can thus be left at that; it only has to be adapted to the connecting lever.

Advantageously, the energy store of the electromechanical actuator, in addition to the previous solutions or also as an alternative design, includes the impact buffer. For that purpose the energy store includes, for example, a first part, a second part and a first spring with a first spring stressing force. In that case, this first spring is stressed between the first part and the second part. The first part and the second part are assembled together to be displaceable over a displacement range. The displacement range is bounded by at least one first, i.e. front, abutment or second, i.e. rear, abutment. This at least one abutment is used for ensuring a minimum first spring stressing force. The energy store is correspondingly so assembled and stressed that it can, over a displacement range, be compressed against the force of the first spring, wherein the at least one abutment determines a minimum biasing force.

The impact buffer is integrated in the first or second part. The relevant first part or second part additionally includes a first sub-member and a second sub-member and the impact buffer connects the first sub-member with the second sub-member. It is thus achieved that a buffer zone able to absorb impact peaks in the energy store can be provided.

The aforesaid impact buffer advantageously includes a spring arrangement. This spring arrangement is biased by a second spring stressing force, which connects and holds together the first sub-member and the second sub-member. The second spring stressing force is set to a value greater than that of the first spring stressing force. The two sub-members are consequently so held together by means of the spring arrangement that they deflect only in the case of higher dynamic forces such as occur in the event of impact of the energy store on an abutment. This is advantageous, because the energy store in the normal actuating process can respond rapidly, since no damping components are effective. An impact is effectively absorbed merely in the case of impinging of the energy store on its end abutment.

Advantageously, one of the two first and second sub-members includes a threaded plate and the other one of the two sub-members includes an impact plate. The spring arrangement biases the impact plate with respect to the threaded plate by means of a tightening screw. This makes possible economic joining together of the two parts and the biasing force of the spring arrangement can thus be set in simple manner. The spring arrangement preferably comprises a plate spring column. This is a laminar arrangement of individual plate springs. High biasing force can thus be achieved.

Advantageously, the first part is connected with the connecting element and the second part is correspondingly connected with the housing of the actuator or with an actuator support. The first part includes a guide for the second part so that the second part is guided in the first part to be displaceable.

The first part advantageously includes a further slot, which co-operates with a guide pin of the second part. This further slot, together with the guide pin, determines the first and second, or front and rear, abutments, which abutments define the displacement range. The energy store itself can thus be simply assembled within the scope of preassembly.

Advantageously, the first and second parts are pivotably connected with the connecting element or with the housing of the actuator or an actuator support. The energy store thus ideally follows a movement of the connecting element or a trigger lever guiding the connecting element. It can execute required pivot movements without hindrance.

Overall, an electromechanical actuator with the afore-described features is suitable for effectively absorbing possible shock loads, which arise both during resetting of the actuator and during triggering of the actuator, and thus preventing damage of the actuator.

DESCRIPTION OF THE DRAWINGS

An exemplifying embodiment with advantageous features is explained in the following by way of examples and schematic embodiments, in which.

The same reference numerals are used for equivalent parts over all figures.

DETAILED DESCRIPTION

Figure 1:
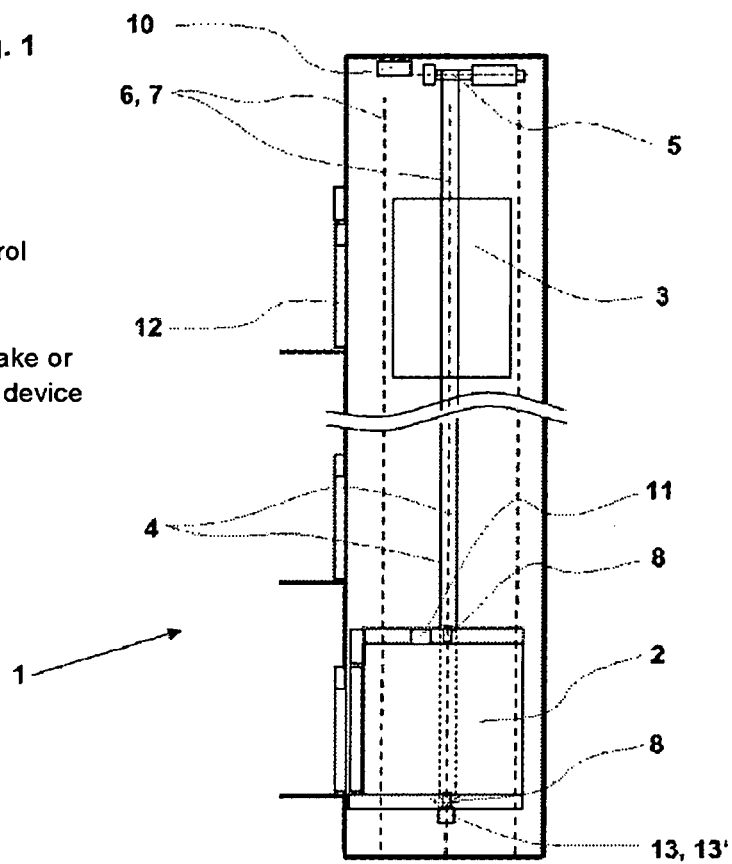
FIG. 1 shows a schematic view of an elevator installation in side view.

FIG. 1 shows an elevator installation 1 in an overall view. The elevator installation 1 is installed in a building and serves for transport of persons or goods within the building. The elevator installation includes an elevator car 2, which can move upwardly and downwardly along guide rails 6. The elevator car 2 is for that purpose provided with guide shoes 8 which guide the elevator car as accurately as possible along a predetermined travel path. The elevator car 2 is accessible from the building by way of shaft doors 12. A drive 5 serves for driving and stopping the elevator car 2. The drive 5 is, for example, arranged in the upper region of the building and the car 2 hangs at the drive 5 by support means 4, for example support cables or support belts. The support means 4 are guided over the drive 5 to a counterweight 3. The counterweight compensates for a mass proportion of the elevator car 2 so that the drive 5 for the main part merely has to compensate for an imbalance between car 2 and counterweight 3. In the example, the drive 5 is arranged in the upper region of the building. It could obviously also be arranged at a different location in the building or in the region of the car 2 or the counterweight 3.

The elevator installation 1 is controlled by an elevator control 10. The elevator control 10 receives user requests, optimizes the operating sequence of the elevator installation and controls the drive 5.

The elevator car 2 and, if required, also the counterweight 3 are additionally equipped with at least one brake suitable for safeguarding and/or retarding the elevator car 2 in the case of an unexpected movement or in the case of excess speed. In the example, two identically constructed brakes 13, 13' are attached to the travel body 2, 3 on either side thereof. The elevator brakes 13, 13' are, in the example, arranged below the car 2 and are actuable by an actuator 20 arranged between the two brakes 13, 13'. The actuator is electrically activated by a brake control 11. This brake control 11 preferably also includes an electronic speed or travel path limiter, which monitors travel movements of the elevator car 2. A mechanical speed limiter, such as is usually used, can accordingly be eliminated.

Figure 2:
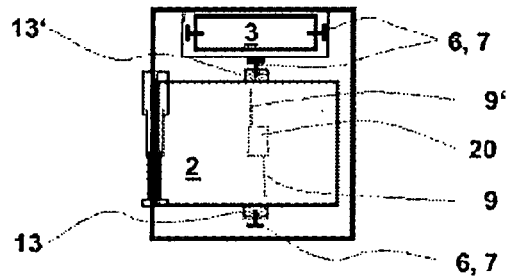
FIG. 2 shows a schematic view of the elevator installation in cross-section.
Figure 3:
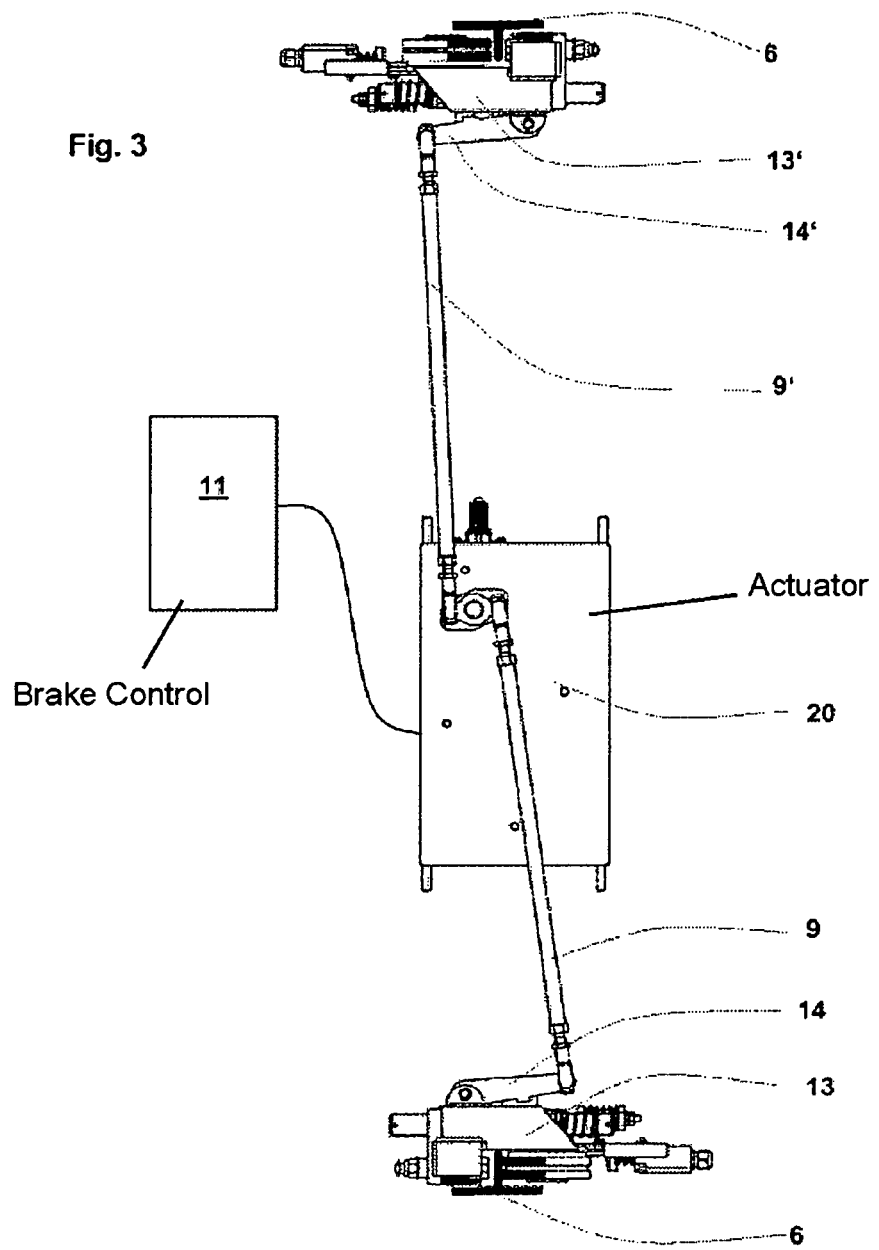
FIG. 3 shows an arrangement with two elevator brakes and actuators.

FIG. 2 shows the elevator installation of FIG. 1 in a schematic plan view. The brake system includes the two elevator brakes 13, 13'. The two elevator brakes 13, 13' are, as illustrated in detail in FIG. 3, coupled with the actuator 20 by way of adjusters 14, 14' and connecting rods 9, 9' so that the two elevator brakes 13, 13' can be constrainedly actuated together. An unintended braking at one side can thus be avoided and the two elevator brakes 13, 13' are actuable in simple manner by way of the common actuating unit 20, which is controlled by the brake control 11. The two elevator brakes 13, 13' are preferably constructed identically or in mirror image and they act on the brake rails 7 arranged at the two sides of the car 2. In the detail explanations with respect to the elevator brake only one elevator brake 13 is mentioned in the following, but the left-hand and right-hand elevator brakes are always signified. The brake rails 7 in the example are identical with the guide rails 6.

Figure 4:
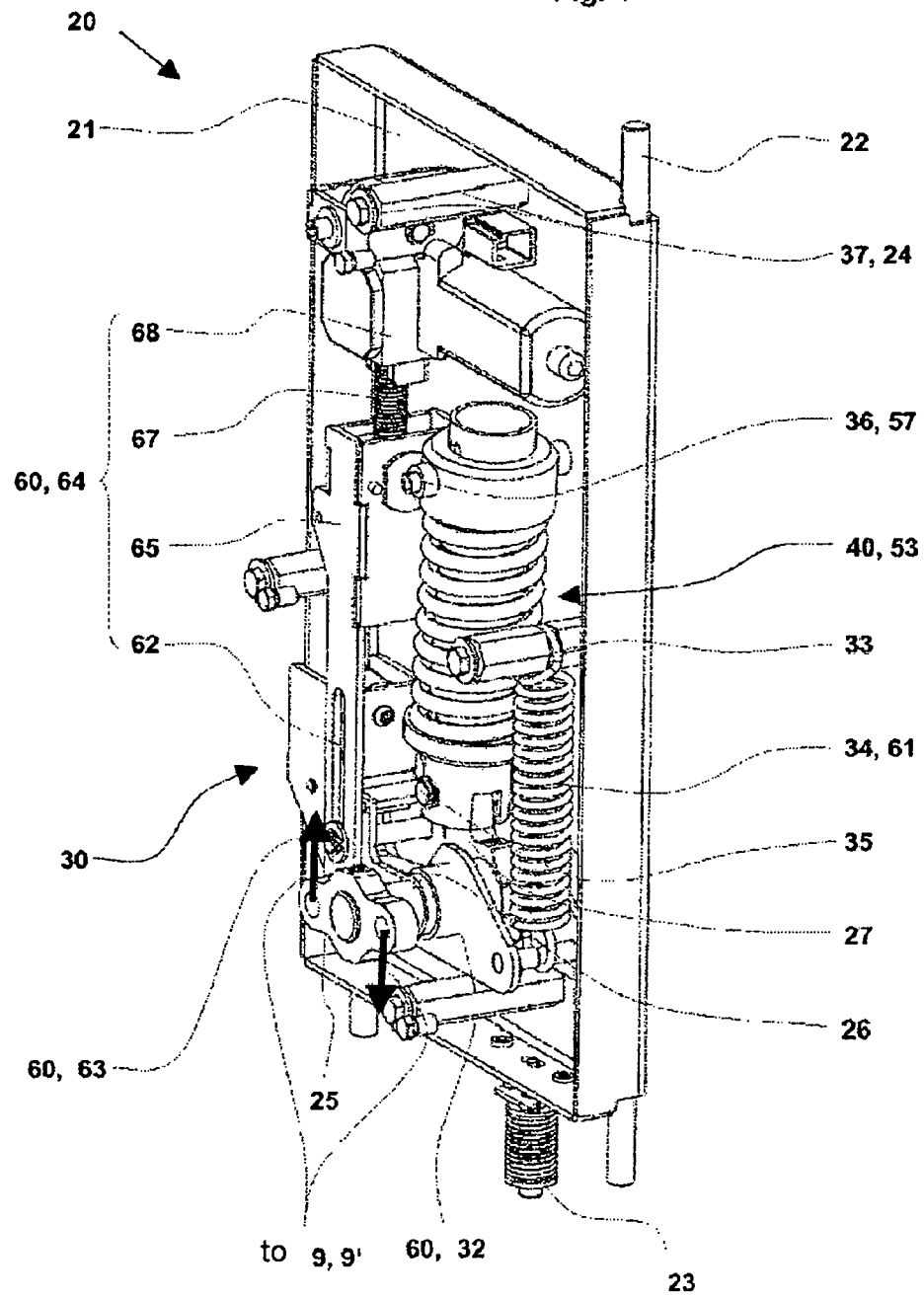
FIG. 4 shows an actuator in a perspective view without cover.
Figure 5:
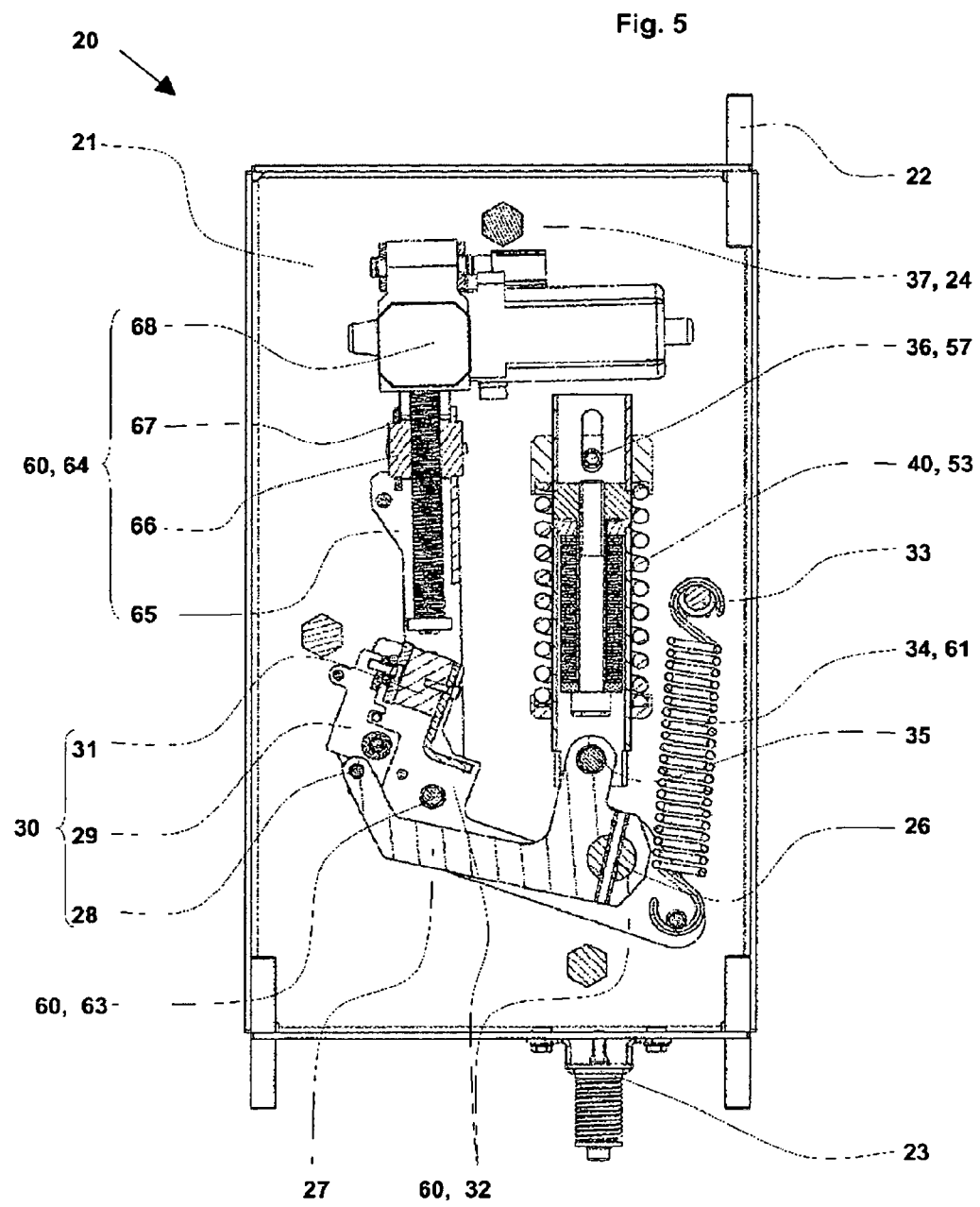
FIG. 5 shows a plan view of an actuator in a readiness setting.

FIGS. 4 and 5 show an actuator 20 in the so-called readiness setting. As readiness setting there is to be understood that the actuator retains the brakes in open setting so that the travel body, or the car or the counterweight, can be moved. The actuator is attached to an actuator support 21 or it includes the actuator support 21. Auxiliary means 37, which inter alia are provided for fastening a cover 24 (not illustrated in the drawings), are preferably arranged on the actuator support 21. The actuator support 21 is provided with mounting elements 22, which allow the actuator 20 to be so arranged at the travel body that it is provided with lateral freedom of movement. The actuator 20 can thus be arranged between two brakes 13, 13' and can when required draw adjusters 14, 14' of the brakes towards one another (or push them away from one another). The mounting elements 22, for example slide pins, make lateral compensation possible. An actuator holder 23 in that case limits the lateral slide path.

A trigger lever 27 is arranged on the actuator support 21. The trigger lever 27 is pivotable about a fulcrum determined by a connecting element 26. By way of example, a connecting strap 25 is connected with the trigger lever 27 by way of the connecting element 26 and the connecting strap 25 enables connection with the brakes 13, 13' by way of appropriate connecting rods 9, 9'. Pivoting of the trigger lever 27 thus causes pivoting of the connecting strap 25 and thereby causes the corresponding connecting rods 9, 9' to be drawn together or pushed apart. In the example, the connecting element 26 is a shaft which is rotatably or pivotably mounted in the actuator support 21 of the actuator and to which the trigger lever 27 and the connecting strap 25 are secured. This shaft forms the fulcrum of the trigger lever 27. An energy store 40 acts on one end of the trigger lever 27 and can introduce force into the trigger lever 27 by way of a front connecting point 35. This force is introduced into the actuator support 21 by way of a rear connecting point 36. The energy store 40 seeks to pivot the trigger lever 27. In the readiness setting of the actuator 20 this is prevented by a retaining device 30, which engages another end of the trigger lever 27 and restrains the trigger lever 27 against the force of the energy store 40. The retaining device 30 consists of a latch 29, which fixes a connecting point 28 of the trigger lever 27. The latch 29 is kept in the readiness setting by an electromagnet 31 (FIGS. 4 and 5).

Figure 6:
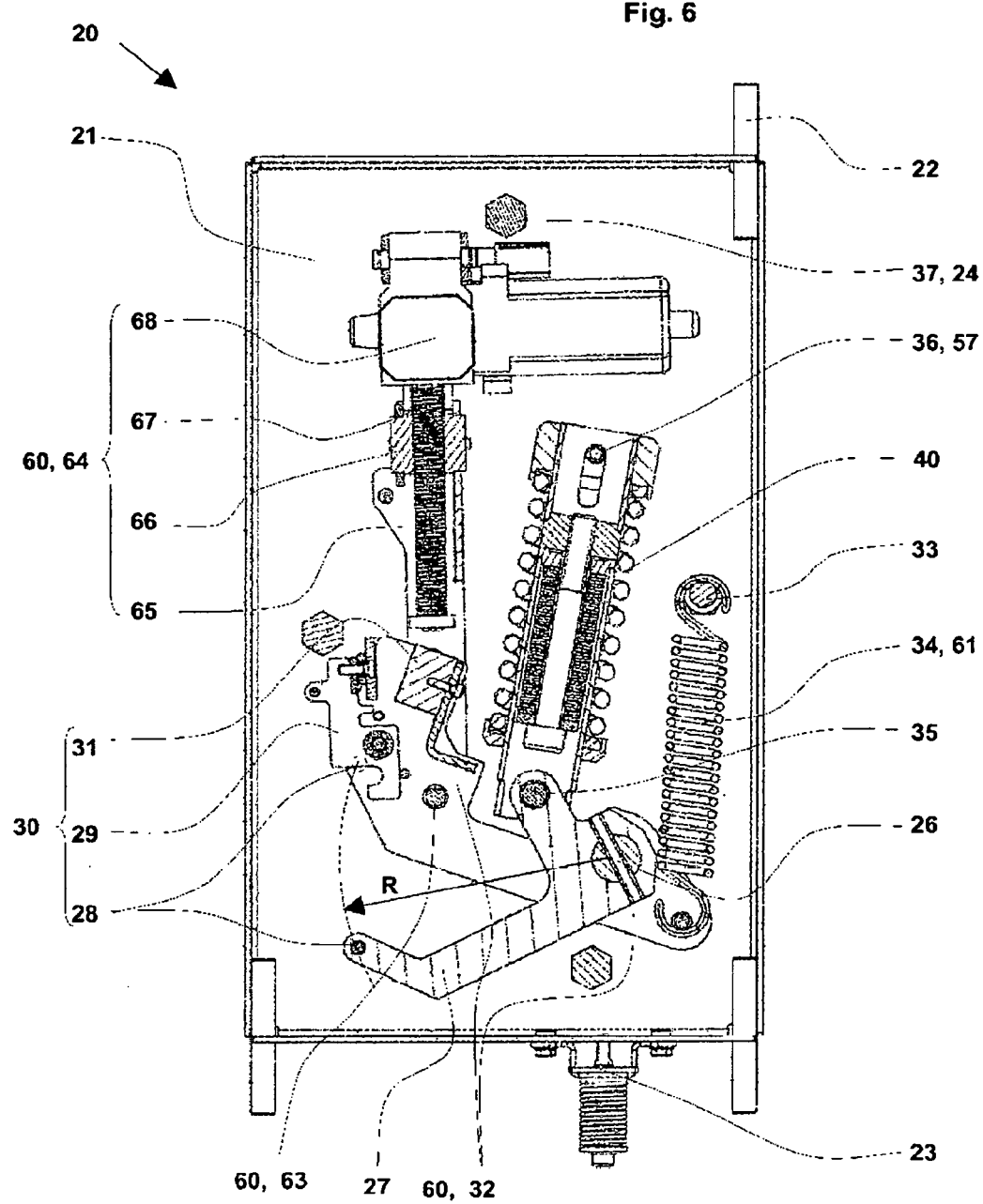
FIG. 6 shows a plan view of an actuator in an actuated setting.

When required, the brake control 11 switches the electromagnet 31 to be free of current, as is apparent from FIG. 6. The latch 29 can thereby be urged away from the connecting point 28 or from possible spring elements and the energy store 40 can correspondingly actuate the trigger lever and obviously the connected connecting element 26 and connecting strap 25, etc.

Figure 10:
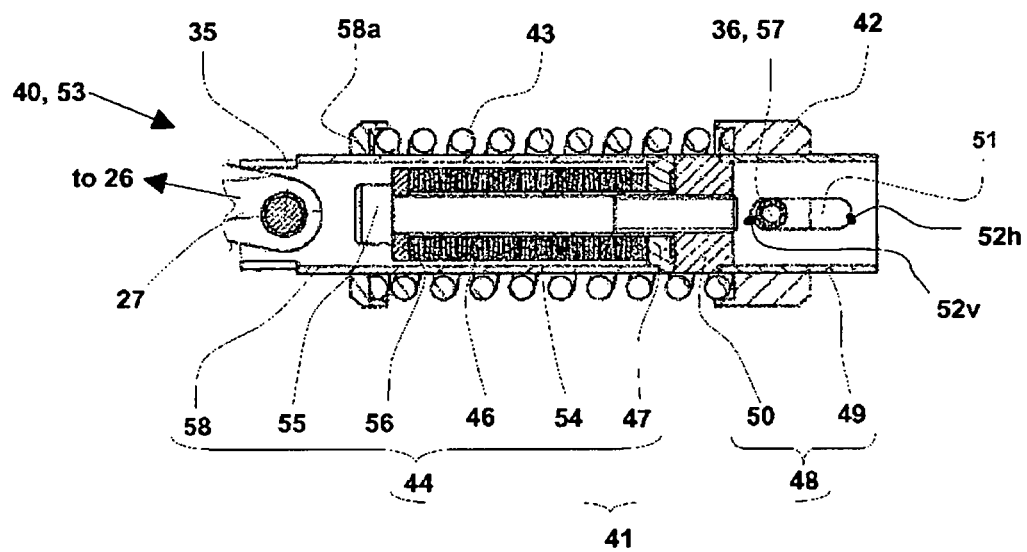
FIG. 10 shows a detail view of an energy store in unbuffered setting.
Figure 11:
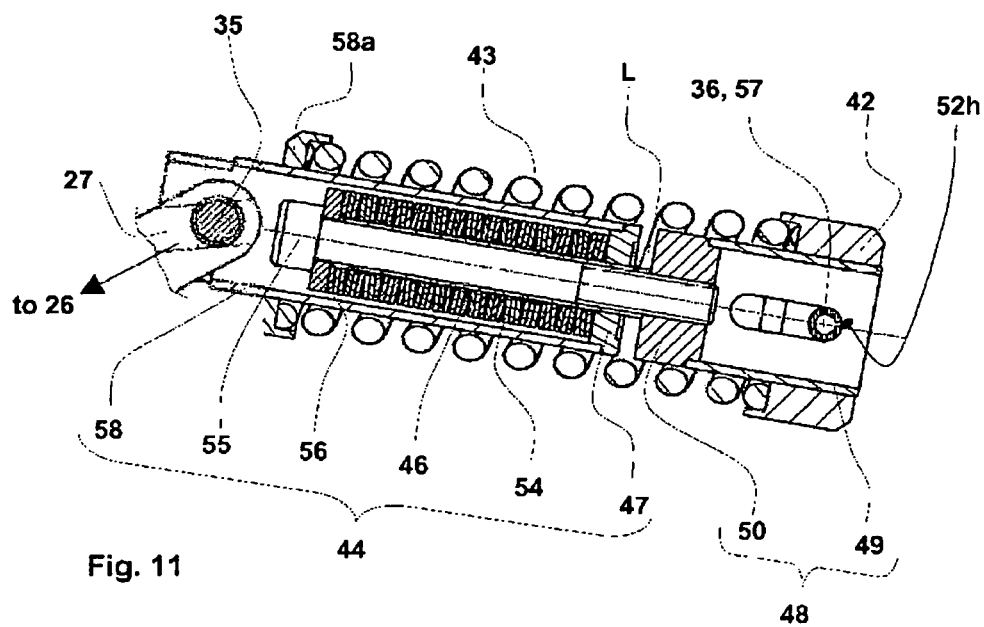
FIG. 11 shows a detail view of an energy store in buffered setting.

The energy store 40 includes an impact buffer 53. The impact buffer 53 has the purpose of absorbing or deflecting a possible shock when the energy store reaches its end abutment or the rear abutment. The construction of an exemplifying energy store 40 with impact buffer is illustrated in FIGS. 10 and 11.

Figure 9:
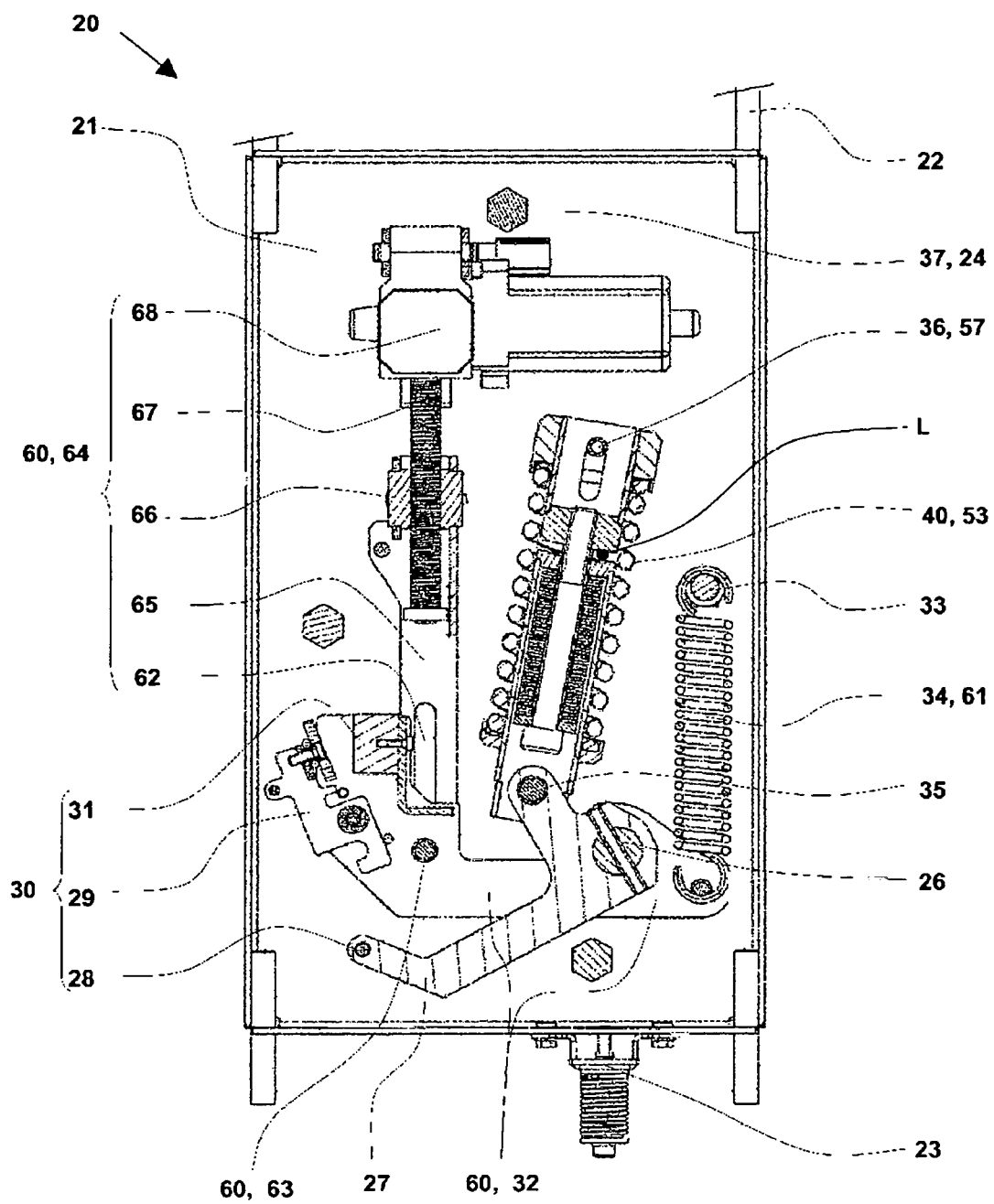
FIG. 9 shows a plan view of an actuator in buffered setting.

In the illustrated example the energy store 40 consists of a first part 41 and a second part 42. These two parts 41 and 42 are urged apart by a first spring 43. The spring 43 generates the actual force of the energy store 40 for actuation of the brakes. The two parts 41, 42 are held together by means of a guide pin 57. Disposed for that purpose in the first part is a slot 51 which in conjunction with the guide pin 57 integrated in the second part 42 defines a displacement range between the first part 41 and the second part 42. If the energy store in the actuator is stressed, the trigger lever compresses the energy store and the guide pin 57 is in the vicinity of the front abutment 52v of the slot 51. FIG. 10 shows the energy store in this stressed state. If the trigger lever 27 is released, the first spring 43 relaxes or it expands the energy store and the guide pin 57 migrates in the direction of a rear abutment 52h in the slot 51. If now an actuator is triggered without, for example, a brake being connected, whether it be for test or modification purposes, the guide pin impinges at high trigger speed and force at the end abutment or the rear abutment 52h. That can lead to destruction of the actuator. In order to avoid this the impact buffer 53 is integrated in the first part 41. For that purpose the first part 41 includes a first sub-member 44 and a second sub-member 48. The two sub-members are pressed together by means of a resilient body, in the example a spring arrangement 54. This pressing together takes place by a compression force which is greater than the force of the compressed first spring 43. If now the guide pin 57 impinges on the rear abutment 52h of the slot 51—see FIGS. 9 and 11—when the first spring 43 is relaxed the first sub-member can move further within the scope of a spring stroke L of the spring arrangement 54 and the impact load in the actuator is thereby reduced.

In the embodiment, the second sub-member 48 includes a second guide tube 49, which is slidably mounted in the second part 42 and is held by way of the guide pin 57. The second part 42 is secured, preferably pivotably, in the actuator 20 by way of the rear connecting point 36. The second part 42 includes a receiving region for the first spring 43. In the embodiment the guide pin 57 and the rear connecting point are realized by the same component. Additionally disposed in the second sub-member 48 is a thread, for example in the form of a threaded plate 50, for connection of the first sub-member 44.

The first sub-member 44 similarly includes a first guide tube 58, which is provided for connection with the trigger lever 27 and which has a corresponding receiving zone 58a for accepting the spring force of the spring 43. The receiving zone 58a and the first guide tube 58 can obviously be of single-part or multi-part construction. The first sub-member 44 includes an impact plate 47. The impact plate 47 is biased by way of the spring arrangement 54 with respect to the second sub-member 48 by a draw screw 55 as well as possible thrust washers 56. Advantageously, a biasing force of the spring arrangement 54 is set by means of a spring tube 46. The spring arrangement 54 is preferably assembled in the form of a column of plate springs.

If the actuator is in the actuated setting as illustrated in FIG. 6, the actuator can be reset by means of a resetting device 60. The resetting device 60 includes a return lever 32. The return lever 32 is, in the example, arranged to be pivotable about the fulcrum defined by the connecting element 26. The return lever 32 and the trigger lever 27 are thus arranged to be pivotable about the same fulcrum and they can thus follow the same pivot radius R. The retaining device 30 together with electromagnet 31 and latch 29 is arranged on the return lever 32. The return lever 32 is connected by way of a guide pin 63 with a return carriage 65, which can be moved forwards and back by means of spindle drive 64.

Figure 7:
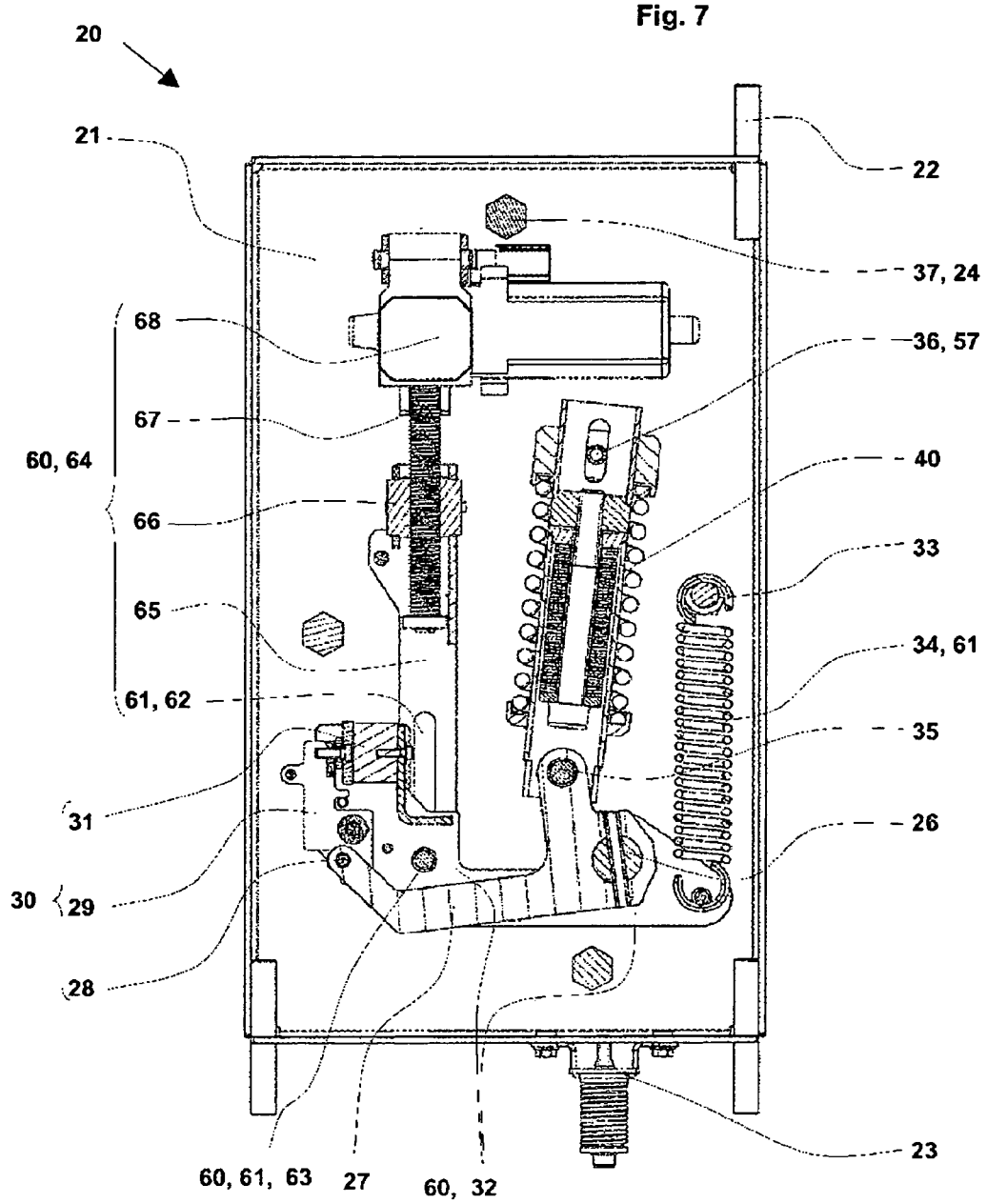
FIG. 7 shows a plan view of an actuator in a restoring situation.
Figure 8:
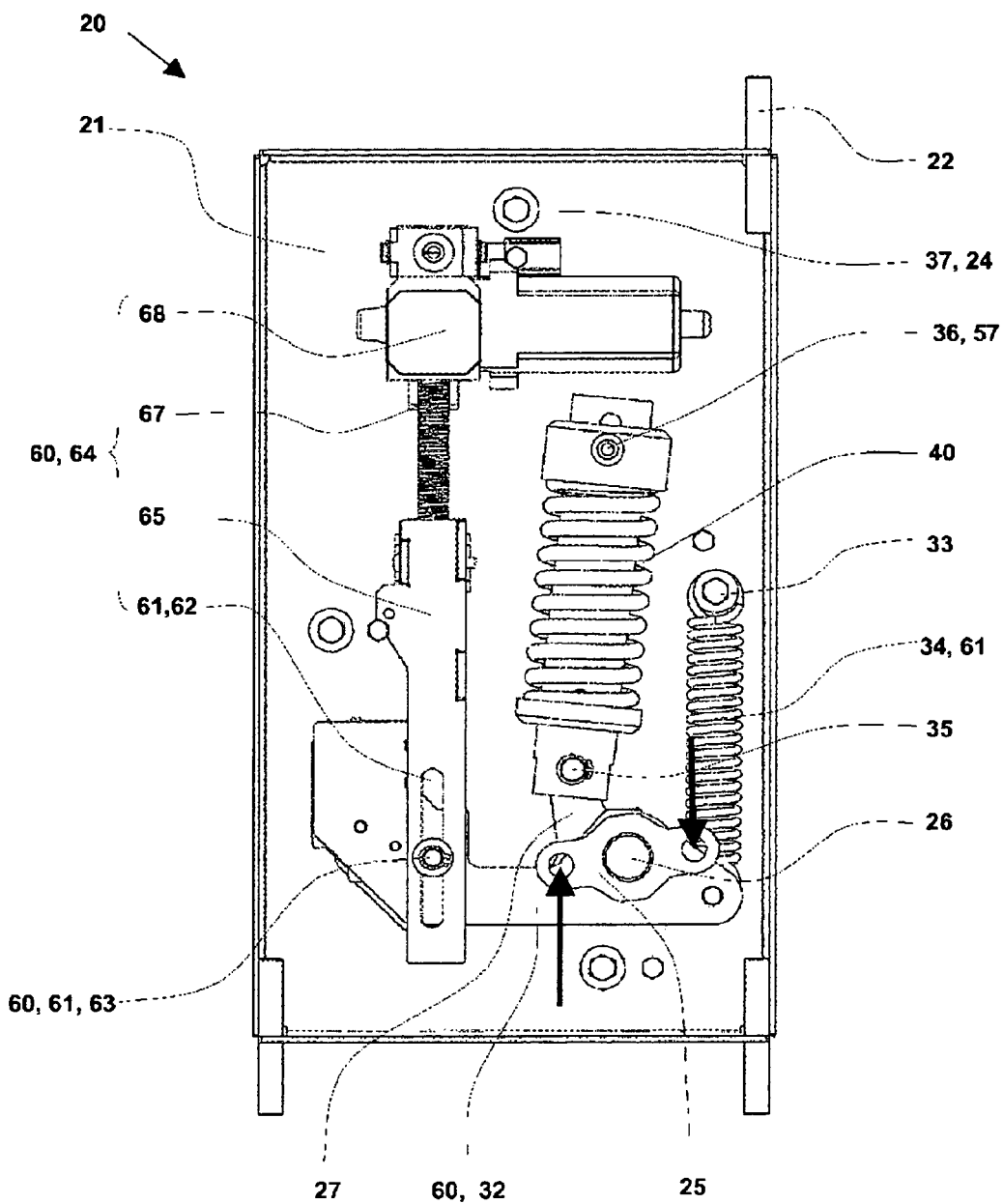
FIG. 8 shows a function view of an actuator in recoil prevention.

The spindle drive 64 includes a geared motor 68 which can drive a return spindle 67. A spindle nut 66 is arranged in the return carriage 65. The spindle nut 66 and thus the return carriage 65 are therefore moved by rotating the return spindle 67. The resetting device 60 or the actuator 20 includes recoil prevention means or device 61 in order to protect the resetting device 60 and the connected parts from overloading. Disposed in the return carriage 65 for that purpose is a slot 62—see FIGS. 7 and 8—which defines a play tolerance between return carriage 65 and return lever 32 with guide pins 63. A counterspring 34 draws the return lever 32 towards a first end of the range of play defined by the slot 62. The counterspring 34 is stressed by way of a counter-pin 33 arranged at the actuator support 21.

For the purpose of resetting, the electromagnet 31 is now preferably activated and the spindle drive 64 moves the return lever 32, together with the retaining device 30, through the pivot radius R with respect to the trigger lever 27 or the latch 29 with respect to the connecting point 28. The return lever 32 is in that case correspondingly drawn by the counterspring 34. As soon as the retaining latch 29 has reached the connecting point 28 the connecting point 28 presses the retaining latch 29 back and the electromagnet 31 can retentively hold the latch 29.

Through return of the return carriage the actuator can now be stressed in the operating setting shown in FIG. 5. The resetting device 60 is of sufficiently strong design in order to stress the energy store 40. The travel paths of the return carriage 65 are obviously controlled by way of switches (not illustrated).

The combination of the slot 62 and the return carriage together with the counterspring 34 now forms the recoil prevention means 61 for the actuator 20. It is a spring-loaded recoil prevention means. If in the course of resetting an external recoil force is exerted on the connecting strap 25, the trigger arm 27 can press back the return lever 32 by way of the resetting device 60 in that—see FIG. 8—the guide pin 63 is displaced in the slot 62 of the return carriage 65 against the force of the counterspring 35. This is achieved through the fact that the recoil prevention means 61 is designed to transmit force merely in a retraction direction, thus only in the direction of a force line of action, and to enable play in the other direction. The spindle drive 64 and therefore the resetting device are thus effectively protected, since external forces cannot cause overloading of the resetting device 60. Correspondingly, connected parts and levers are also protected from overloading.

The illustrated embodiments can be varied by the expert. For example, use can also be made of a pneumatic device instead of the spindle drive. The recoil prevention means, which in the example is arranged by means of slot and guide pin between return lever and return carriage, could also be in the region of the fastening of the spindle drive in the actuator support.

In the present description the energy store 40 and the recoil prevention means or device 61 are used together in the actuator 20. However, it is also possible to employ and use the two items independently. The energy store protected by the impact buffer can be used for numerous purposes where protection of energy store from destruction is concerned. However, the best effect is achieved by use of both items, since an actuator is thus comprehensively protected.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An electromechanical actuator for attachment to a travel body of an elevator installation and for actuating an elevator brake of the travel body, the actuator comprising:
   an energy store;
   a retaining device;
   a resetting device; and
   a connecting element connecting the actuator with the elevator brake,
      wherein the resetting device acting through the retaining device at least one of retains the energy store and the connecting element in a first operating position corresponding with a readiness setting of the brake and returns the energy store to the first operating position,
      wherein the energy store upon release of the retaining device acts on the connecting element to actuate the brake into an applied setting, wherein the energy store includes a rear abutment and has an impact buffer so that when the energy store impinges in an end position, the end position determined by the rear abutment, recoil is reduced, wherein the enemy store includes a first part, a second part and a first spring with a first spring stressing force, wherein the first spring is compressed between the first and second parts, wherein the first part and the second part are displaceable relative to one another over a displacement range and the displacement range is bounded by at least one of a front abutment and the rear abutment and the at least one abutment ensures a minimum first spring stressing force, wherein the impact buffer is integrated into one of the first and second parts, and wherein the one of the first and second parts includes a first sub-member and a second sub-member and the impact buffer connects the first sub-member with the second sub-member, wherein the impact buffer includes a spring arrangement with a second spring stressing force, which spring arrangement connects the first sub-member with the second sub-member and holds the first and second sub-members together, and wherein the second spring stressing force is set to a greater value than the first spring stressing force, and wherein one of the first and second sub-members includes a threaded plate and another one of the first and second sub-members includes an impact plate and the spring arrangement tightens the impact plate relative to the threaded plate by a draw screw.

2. The actuator according to claim 1 wherein the first part includes a slot that co-operates with a guide pin of the second part and which determines the front and rear abutments that form the displacement range.

3. The actuator according to claim 1 wherein the first and second parts are pivotably connected by one of a trigger lever, the connecting element and an actuator support.

4. The actuator according to claim 1 wherein the resetting device includes a spring-loaded recoil prevention device relieving the resetting device of recoil forces, wherein the resetting device is connected with the retaining device by a return carriage and the retaining device is connected with a counterspring urging the retaining device into a position corresponding with a force transmission direction of the recoil prevention device.

5. An elevator installation with the travel body being one of an elevator car and a counterweight, the travel body having at least two of the elevator brakes and the electromechanical actuator according to claim 1 coupled to the elevator brakes.

6. An electromechanical actuator for attachment to a travel body of an elevator installation and for actuating an elevator brake of the travel body, the actuator comprising:
an energy store;
a retaining device;
a resetting device; and
a connecting element connecting the actuator with the elevator brake, wherein the resetting device acting through the retaining device at least one of retains the energy store and the connecting element in a first operating position corresponding with a readiness setting of the brake and returns the energy store to the first operating position, wherein the energy store upon release of the retaining device acts on the connecting element to actuate the brake into an applied setting, wherein the energy store includes a rear abutment and has an impact buffer so that when the energy store impinges in an end position, the end position determined by the rear abutment, recoil is reduced, wherein the energy store includes a first part, a second part and a first spring with a first spring stressing force, wherein the first spring is compressed between the first and second parts, wherein the first part and the second part are displaceable relative to one another over a displacement range and the displacement range is bounded by at least one of a front abutment and the rear abutment and the at least one abutment ensures a minimum first spring stressing force, wherein the impact buffer is integrated into one of the first and second parts, and wherein the one of the first and second parts includes a first sub-member and a second sub-member and the impact buffer connects the first sub-member with the second sub-member, and wherein the first part is connected with the connecting element by a trigger lever, and the second part is connected with an actuator support, and wherein the second part includes a guide for the first part so that the first part is guided in and displaceable relative the second part.

7. The actuator according to claim 6 wherein the resetting device includes a spring-loaded recoil prevention device relieving the resetting device of recoil forces, wherein the resetting device is connected with the retaining device by a return carriage and the retaining device is connected with a counterspring urging the retaining device into a position corresponding with a force transmission direction of the recoil prevention device.

* * * * *